April 30, 1968  M. A. D'AMATO  3,380,248
CLOSED CIRCUIT FLUID, MOTOR, PUMP AND RESERVOIR
SYSTEM AND TRANSMISSION VALVE THEREFOR
Filed April 20, 1966  2 Sheets-Sheet 1

INVENTOR
MICHAEL A. D'AMATO

BY *James H. Littlepage*

ATTORNEY

April 30, 1968　　　M. A. D'AMATO　　　3,380,248
CLOSED CIRCUIT FLUID, MOTOR, PUMP AND RESERVOIR
SYSTEM AND TRANSMISSION VALVE THEREFOR
Filed April 20, 1965　　　　　　　　　　　　　　2 Sheets-Sheet 2

INVENTOR
MICHAEL A. D'AMATO

BY *James H. Littlepage*
ATTORNEY

United States Patent Office 3,380,248
Patented Apr. 30, 1968

3,380,248
CLOSED CIRCUIT FLUID, MOTOR, PUMP AND RESERVOIR SYSTEM AND TRANSMISSION VALVE THEREFOR
Michael A. D'Amato, West Des Moines, Iowa, assignor to Delavan Manufacturing Company, West Des Moines, Iowa, a corporation of Iowa
Filed Apr. 20, 1966, Ser. No. 543,917
7 Claims. (Cl. 60—53)

ABSTRACT OF THE DISCLOSURE

A reversible fluid pump having two fluid ports is connected via a transmission valve both to a fluid motor which is reversible according to which of two fluid ports receives pressure fluid from the pump, and also to and from a fluid reservoir. The transmission valve has a multiple spool and cooperating lands and grooves, the spool moving between three discrete positions in accordance with direction of pressure fluid delivered from one or the other or neither of the pump ports. When pressure fluid is delivered from either pump port, the transmission valve establishes a pressure fluid path to a corresponding motor port and a return fluid path from the other motor port to the reservoir and back from the reservoir to the then low pressure port of the pump. When pressure fluid is delivered from neither pump port, the spool blocks fluid flow to and from the motor ports, thereby blocking movement of the motor. The system is characterized by the absence of check valves.

---

This invention relates to a hydraulic pump and motor system and transmission valve therefor, including a reversible variable displacement pump, a reversible hydraulic motor, a reservoir, and a transmission valve for automatically establishing a flow circuit from whichever side of the pump is at high pressure to a corresponding input side of the motor, and from whichever is then the exhaust side of the motor through the reservoir and back to the then low pressure side of the pump.

Variable displacement wobble plate pumps of the type preferably utilized in the subject system are capable of over-center operation, i.e., by adjustment of the wobble plate from one angular extreme through neutral to another angular extreme, the oil can be regulated from maximum delivery in one direction to no delivery in neutral and then to maximum delivery in the other direction. Likewise, a reversible hydraulic motor connected thereto can be made to run in one direction or the other depending upon the direction of oil pumped thereto, and to be locked if fluid flow in both directions is blocked. This over-center pump operation may also be used to accurately position a connected actuator, such as a rotary hydraulic motor or a fluid piston. To accomplish this over-center operation, provision must be made to supply inlet oil to that fluid line of the pump which happens to be low pressure (depending upon the position of the wobble plate) at any given time. Usually this has been done by supercharging the system with check valves, whereby oil under pressure, usually at about 50 p.s.i. is fed into whichever line of the pump is the low pressure one.

The aforesaid prior art system is costly and complicated. It necessitates continuous use of the oil that is trapped in the closed loop. Eventually all oil is used because slippage oil goes back to the tank, but the use of the tank for cooling, filtering and conditioning of the oil is limited. Furthermore, this type circuit provides regenerative braking; when the hydraulic motor free wheels, it acts as a pump, and the pump then acts as a motor rotating its prime mover. It is the object now to provide a system which eliminates the supercharging of the system and the use of check valves, which provides for full circulation of the oil through a reservoir and which, in event the pump is caused to go from a pumping condition to a neutral condition, the valve will center itself to a neutral position and automatically brake the motor by cutting off flow to the pump inlet and from the pump exhaust.

These and other objects will be apparent from the following specification and drawings, in which.

Figure 1:
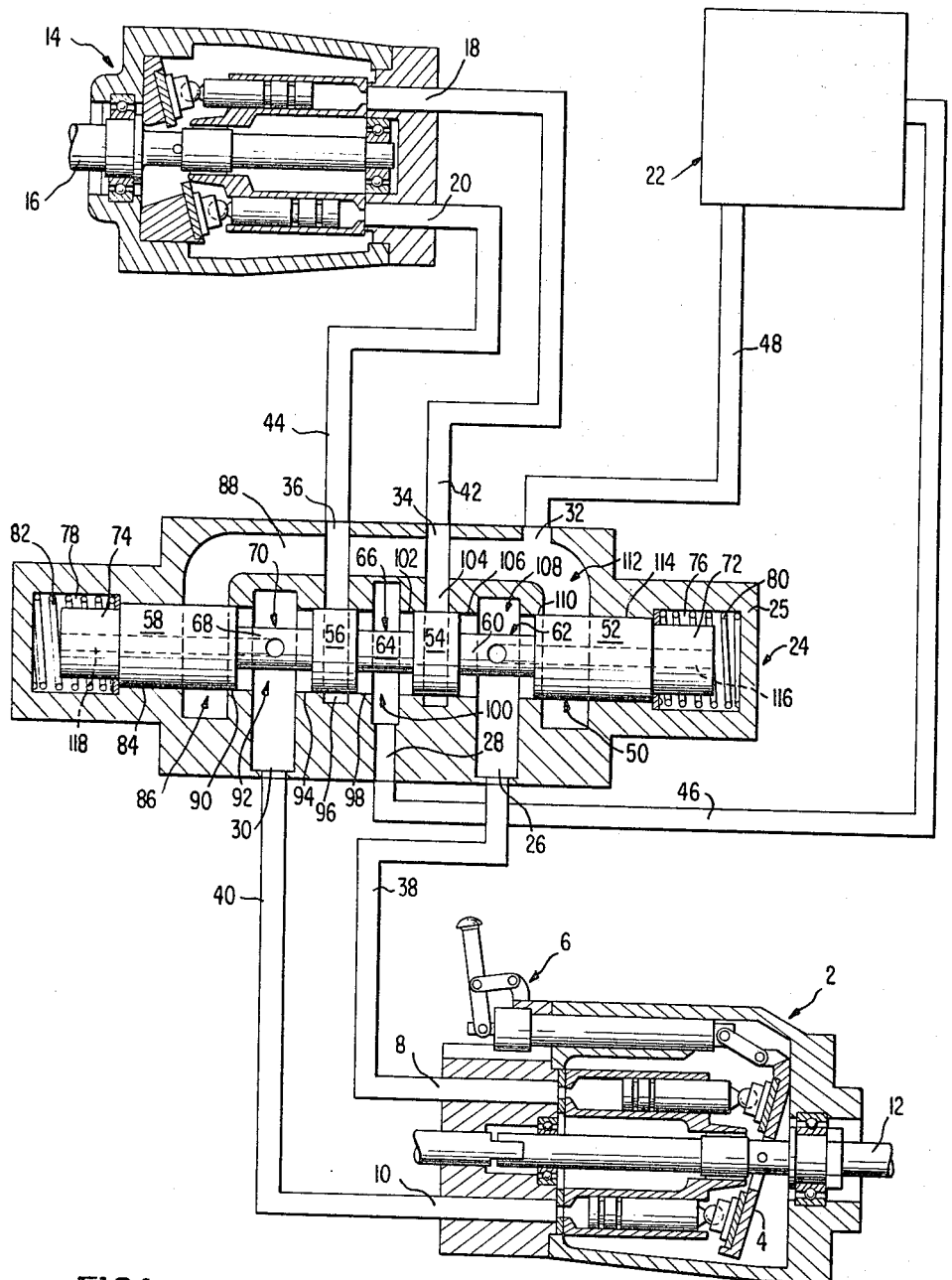
FIG. 1 is a diagrammatic view of the system, showing the pump, transmission valve and motor in cross-section, with the transmission valve in neutral condition.

Referring now to the drawings, in which like reference numerals denote similar elements, there is shown in the lower portion of FIG. 1 a conventional reversible hydraulic pump 2 which, for example, may be of the type having a wobble plate 4 adjusted by a control mechanism 6 through various angular positions to vary the flow of liquid through ports 8 and 10. In this instance, it will be assumed that, upon rotation of drive shaft 12 in one direction by a prime mover, not shown, high pressure fluid is delivered from port 10 and low pressure fluid returns through port 8. If control mechanism 6 is adjusted to tip wobble plate 4 to a neutral position, equilibrium pressures prevail in ports 8 and 10, and if control mechanism 6 is adjusted to reverse the angle of wobble plate 4 from that shown, port 8 becomes the high pressure delivery port and port 10 becomes the low pressure return port. Any type of variable delivery reversible pump capable of the above-stated functions can be utilized.

In the upper left-hand portion of FIG. 1 is shown a reversible hydraulic motor 14 having a drive shaft 16 and ports 18 and 20. If high pressure fluid is supplied to port 18, drive shaft 16 rotates in one direction and low pressure fluid exhausts via port 20; if high pressure fluid is supplied via port 20, drive shaft 16 rotates in the opposite direction and low pressure fluid exhausts via port 18; and if the flow of fluid to and from both ports 18 and 20 is blocked, drive shaft 16 is locked. The motor shown is merely exemplary of many such reversible hydraulic motors.

Figure 2:
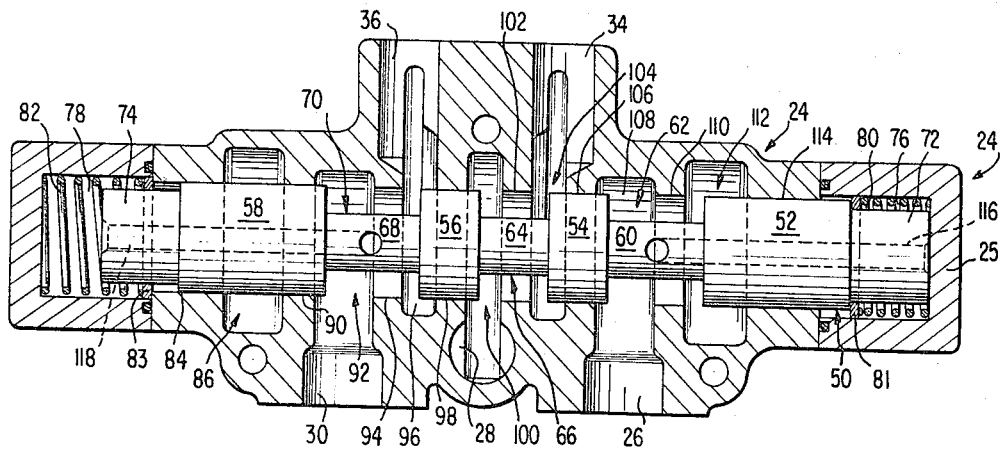
FIG. 2 is a cross section through the distributor valve showing the same in one actuated position; and, FIG. 3 is a cross-section through the distributor valve in a position similar to that of FIG. 2, but in a plane 90° from the cross-sectional plane of FIG. 2.
Figure 3:
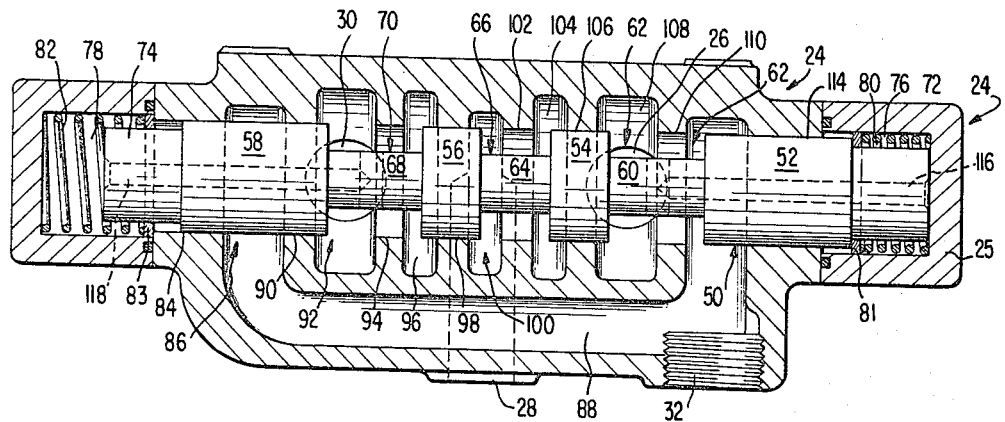

In the upper right-hand portion of FIG. 1 is shown a conventional reservoir 22 which usually contains a filter, not shown, and may contain a cooler and/or other liquid-treating apparatus. Centrally disposed in FIG. 1, and mechanically detailed in FIGS. 2 and 3 is an automatic transmission valve 24 which establishes closed circuits between pump 2, motor 14 and reservoir 22 so that pressure fluid from either port 8 or port 10 will flow to a corresponding port 18 and 20 in motor 14 and return to the other pump port via reservoir 22. The showing of valve 24 in FIG. 1 is somewhat diagrammatic in that all the ports are shown in the same plane so that all of the fluid connections can be illustrated. In actual practice, valve 24 is constructed as shown in FIGS. 2 and 3.

Distributor valve 24 has a casing 25 having six ports 26, 28, 30, 32, 34 and 36. Port 26 of valve 24 is connected to port 8 of pump 2 via a conduit 38; port 28 of valve 24 is connected to the input side of reservoir 22 via a supply conduit 46; port 30 of valve 24 is connected to port 10 of pump 2 via a conduit 40; port 32 of valve 24 is connected to reservoir 22 via a feeder conduit 48; port 34 of valve 24 is connected to port 18 of motor 14 via conduit 42; and port 36 of valve 24 is connected to port 20 of motor 14 via conduit 44.

Reciprocating within casing 25 of valve 24 is a multiple spool 50 having a series of spaced cylindrical lands 52, 54, 56 and 58. Between lands 52 and 54 is a shank 60 of reduced diameter which, with the adjacent lands defines a groove 62; between lands 54 and 56 is a reduced shank 64 which, with the adjacent lands, defines a groove 66; and between lands 56 and 58 is a reduced shank 68 which, with the adjacent lands, defines a groove 70. At opposite ends of multiple spool 50 are cylindrical bosses 72 and 74.

At opposite ends of valve casing 25 are a pair of chambers 76 and 78 which house bosses 72 and 74. Surrounding bosses 72 and 74 respectively are compression springs 76 and 78 which, by their engagement with washers 81 and 83, which normally abut lands 52 and 58, tend to maintain spool valve 50 centered as shown in FIG. 1. Cooperating with the lands and grooves on multiple spool 50 there are, in casing 25, a series of lands and grooves which, progressing from left to right in the drawings, consist of a land 84 which always sealingly engages around valve land 58; a groove 86 which always communicates with port 32 (returning from reservoir 22) via passage 48; a land 90 which seals around land 58 when the latter is in the position of FIGS. 2 and 3; a groove 92 which always communicates with port 30 (leading to pump 2); a land 94 which seals around land 56 when multiple spool 50 is centered or in position opposite to that shown in FIGS. 2 and 3; a groove 96 which always communicates with port 36 (leading to motor 14); a land 98 which seals around land 56 when valve 50 is centered or in the position of FIGS. 2 and 3; a groove 100 which always communicates with port 28 (leading to reservoir 22); a land 102 which seals around land 54 when multiple spool 50 is centered or in position opposite to that shown in FIGS. 2 and 3; a groove 104 which always communicates with port 34 (leading to motor 14); a land 106 which seals around land 54 when multiple spool 50 is centered or in the position of FIGS. 2 and 3; a groove 108 which always communicates with port 26 (leading to pump 2); a land 110 which seals around land 52 when multiple spool 50 is centered or in the position opposite to that of FIGS. 2 and 3; a groove 112 which always communicates with groove 86 via passage 88 and port 32 (returning from reservoir 22); and a land 114 which always seals around land 52. Chamber 76 in the right-hand end of the valve casing 25 always communicates with port 26 via grooves 62, 108 and a duct 116 which terminates in shank 60 and in the end of boss 72. Likewise, chamber 78 in the left-hand end of casing 25 always communicates with port 30 via grooves 70, 92 and duct 118 which terminates in shank 68 and the end of boss 74.

In operation, let it be assumed that pump 2 is not running or that control 6 has been adjusted to a neutral position so that equilibrium pressures prevail at valve port 26 and 30. Equilibrium pressures thus prevail in chambers 76 and 78, and springs 80 and 82 center multiple spool 50 in its FIG. 1 position. Land 56 seals against casing lands 94 and 98 and thus block groove 56 from both pairs of grooves 70, 92 and 66, 100 so that no fluid can flow via valve port 36 and conduit 44 to or from motor port 20. Likewise, land 54 seals against casing lands 102 and 106, thereby blocking groove 104 from both pairs of grooves 66, 100 and 62, 108 so that no fluid can flow via valve port 34 and conduit 42 to or from motor port 118. Thus, in the equilibrium position of multiple spool 50, motor shaft 16 is locked against rotation.

Now let it be assumed that pump control 6 is shifted to its FIG. 1 position so that high pressure fluid flows via pump port 10, conduit 40, valve port 30 and grooves 92, 70 and duct 118 into chamber 78. Land 58 thereupon functions as a piston, forcing multiple spool 50 to its position of FIGS. 2 and 3, chamber 76 then being connected to the low-pressure side of the pump. The then high pressure port 10 of pump 2 is thus connected to motor port 20 via valve port 30, grooves 92, 70 and 96, port 36 and conduit 20. The then exhaust port 18 of motor 14 is connected via conduit 42 and valve port 34 to the input conduit 46 of reservoir 22 via grooves 104, 66, 100 and casing port 28. The return conduit 48 from reservoir 22 is then connected to the low pressure port 8 of pump 2 via casing port 32, grooves 112, 62, 108, casing port 26 and conduit 38. If pump control 6 were shifted to the opposite position so that port 8 became the high pressure port, then multiple spool 50 would shift to the position opposite to that of FIGS. 2 and 3, pump port 8 would be connected to motor port 18 and fluid would exhaust from motor port 20, via valve 24 and input conduit 46 to reservoir 22, and thence back to the then low pressure port 10 of pump 2 via return line 48, valve 24 and conduit 40.

In the neutral (FIG. 1) position of multiple spool 50, flow of fluid from groove 100 via port 28 and supply conduit 46 to reservoir 22 is blocked by the sealing of lands 54 and 56 against lands 102 and 98, respectively, and flow of fluid back from reservoir 22 via conduit 48 is blocked by the sealing of land 52 between lands 110 and 114 which blocks groove 112, and by the sealing of land 58 against lands 84 and 90, which blocks groove 86.

The invention is not limited to the details described and shown herein, but is intended to cover all substitutions, modifications and equivalents within the scope of the following claims.

I claim:

1. A closed circuit fluid motor, pump, reservoir and transmission valve system, characterized by the absence of check valves, comprising, in combination, a reversible fluid pump having first and second fluid conduits and a device for controlling the pump between a first condition wherein high pressure fluid flows from the pump via the first conduit and low pressure fluid returns to the pump via the second conduit, a second condition wherein substantially no fluid flows through either conduit, and a third condition wherein high pressure fluid flows from the pump via the second conduit and low pressure fluid returns to the pump via the first conduit;

a reversible fluid motor having an actuator and first and second fluid lines, characterized by application of force to said actuator in one direction when pressure fluid flows to the motor via the first line and exhausts via the second line, locking of said actuator when flow of fluid through both lines is blocked, and application of force to said actuator in a direction opposite to said one direction when pressure fluid flows to the motor via the second line and exhausts via the first line;

a fluid reservoir having a fluid inlet and a fluid outlet;

and a single transmission valve connecting all of said conduits, lines, inlet and outlet, said transmission valve comprising control means responsive to relative pressures of fluid in said first and second conduits for movement between first, second and third positions respectively in response to relatively greater pressure in said first conduit, equal pressures in said first and second conduits, and relatively greater pressure in said second conduit, said control means in said first position establishing a fluid path from said first conduit to said first line, a fluid path from said second line to said inlet, and a fluid path from said outlet to said second conduit, said control means in said second position establishing blocks across both said lines, said control means in said third position establishing a fluid path from said second conduit to said second line, a fluid path from said first line to said inlet, and a fluid path from said outlet to said first conduit.

2. The combination claimed in claim 1, said transmission valve including means for normally biasing said control means to said second position.

3. In combination, a reversible fluid pump having first and second fluid conduits and a device for controlling the pump between a first condition wherein high pressure fluid flows from the pump via the first conduit and low pressure fluid returns to the pump via the second conduit, a second condition wherein substantially no fluid flows through either conduit, and a third condition wherein high pressure fluid flows from the pump via the second conduit and low pressure fluid returns to the pump via the first conduit;

a reversible fluid motor having an actuator and first and second fluid lines, characterized by application of force to said actuator in one direction when pressure fluid flows to the motor via the first line and exhausts via the second line, locking of said actuator when flow of fluid through both lines is blocked, and application of force to said actuator in a direction opposite to said one direction when pressure fluid flows to the motor via the second line and exhausts via the first line;

a fluid reservoir having a fluid inlet and a fluid outlet;

a transmission valve means connecting all of said conduits, lines, inlet and outlet, said transmission valve means comprising control means responsive to relative pressures of fluid in said first and second conduits for movement between first, second and third positions respectively in response to relatively greater pressure in said first conduit, equal pressures in said first and second conduits, and relatively greater pressure in said second conduit, said control means in said first position establishing a fluid path from said first conduit to said first line, a fluid path from said second line to said inlet, and a fluid path from said outlet to said second conduit, said control means in said second position establishing blocks across both said lines, said control means in said third position establishing a fluid path from said second conduit to said second line, a fluid path from said first line to said inlet, and a fluid path from said outlet to said first conduit, said transmission valve means including means for biasing said control means to said second position, said transmission valve means comprising a casing having chambers opposite ends thereof and a bore connecting said chambers, said control means comprising a multiple spool reciprocatable in said bore and having first and second lands respectively adjacent opposite ends thereof and third and fourth lands respectively spaced by first and second grooves from said first and second lands and by a third groove from each other, said casing having first and second lands at inner ends of said first and second chambers and sealing against the first and second lands on said multiple spool in all positions of the latter, said casing having first and second grooves connected to said first and second conduits and registering with the first and second grooves of the multiple spool in all positions of the latter, said multiple spool having ducts and respectively leading from first and second multiple spool grooves and terminating in the first and second chambers, whereby pressure fluid entering said first casing groove flows to the first chamber via one duct, while the second chamber is vented to the second casing groove via the other duct.

4. The combination claimed in claim 3, the means for biasing said control means to said second position comprising compression springs in said first and second chambers operatively engageable with the first and second lands on the multiple spool.

5. A transmission valve comprising a casing having a bore, said casing having first, second, third, fourth, fifth and sixth ports therein, said first and second ports being adapted to be connected to respective ports of a reversible hydraulic pump, said third and fourth ports being adapted to be connected to respective ports of a reversible hydraulic motor, said fifth port being adapted to be connected to a conduit leading to a reservoir, said sixth port being adapted to be connected to a return line leading from said reservoir, said casing having a plurality of lands therein and grooves between the lands respectively communicating with said ports, and a multiple spool reciprocatable in said bore, said multiple spool having a plurality of lands and grooves thereon respectively cooperating with the lands and grooves in said casing and being axially shiftable in said bore from a neutral position in which the respective lands on said spool and said casing block communication between all said casing grooves to a first actuated position axially displaced in one axial direction in which communication is established between the casing grooves communicating with the first and fourth casing parts, the casing grooves communicating with the third and fifth casing ports, and the second and sixth casing ports, and to a second actuated position in which communication is established between the first and sixth casing ports, the second and third casing ports, and the fourth and sixth casing ports, and means for shifting said spool between said actuated positions.

6. The combination claimed in claim 5, the means for shifting said spool between said actuated positions comprising chamber means at each end of the casing bore, lands on opposite ends of said spool slidably sealing against said casing so as to isolate said chambers from the remainder of the casing bore, said spool having piston surfaces at each end exposed to the interior of the respective chambers, and ducts establishing fluid connections between the first casing port and one chamber and between the second casing port and the other chamber.

7. The combination claimed in claim 6, and compression springs disposed in said chambers and respectively engaging between said casing and opposite ends of said spool for biasing said spool to said neutral position.

References Cited

UNITED STATES PATENTS

| 2,836,960 | 6/1958 | Wittren | 60—52 |
| 2,916,879 | 12/1959 | Gondek | 60—52 |

FOREIGN PATENTS 824,279  11/1959  Great Britain.

EDGAR W. GEOGHEGAN, *Primary Examiner.*